United States Patent
Glasker et al.

(10) Patent No.: US 9,876,309 B2
(45) Date of Patent: Jan. 23, 2018

(54) CLIP-ON BRACKET FOR A PLUG-IN CONNECTOR

(71) Applicant: Harting Electronics GmbH, Espelkamp (DE)

(72) Inventors: Nicolas Glasker, Osnabrueck (DE); Hartmuth Schmidt, Ostercappein (DE); Andre Grafe, Bohmte (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 128 days.

(21) Appl. No.: 14/778,808

(22) PCT Filed: Jan. 16, 2014

(86) PCT No.: PCT/DE2014/100010
§ 371 (c)(1),
(2) Date: Sep. 21, 2015

(87) PCT Pub. No.: WO2014/146640
PCT Pub. Date: Sep. 25, 2014

(65) Prior Publication Data
US 2017/0162978 A1 Jun. 8, 2017

(30) Foreign Application Priority Data
Mar. 21, 2013 (DE) .................. 10 2013 102 886

(51) Int. Cl.
*G02B 6/36* (2006.01)
*H01R 13/58* (2006.01)
*H01R 13/56* (2006.01)
*G02B 6/38* (2006.01)

(52) U.S. Cl.
CPC ....... *H01R 13/5841* (2013.01); *G02B 6/3825* (2013.01); *G02B 6/3829* (2013.01); *G02B 6/3887* (2013.01); *G02B 6/3893* (2013.01); *H01R 13/562* (2013.01); *H01R 13/5812* (2013.01)

(58) Field of Classification Search
CPC .. G02B 6/3825; G02B 6/3829; G02B 6/3887; G02B 6/3893; H01R 13/5841; H01R 13/562; H01R 13/5812
USPC .......................................................... 385/76
See application file for complete search history.

(56) References Cited

U.S. PATENT DOCUMENTS

| 2004/0121646 A1* | 6/2004 | Iamartino | G02B 6/3829 439/445 |
| 2008/0009173 A1* | 1/2008 | Carnahan | H01R 13/516 439/352 |
| 2010/0247041 A1 | 9/2010 | Szilagyi | |

FOREIGN PATENT DOCUMENTS

| DE | 202007008980 | 1/2008 |
| EP | 1139503 | 10/2011 |
| GB | 2140225 | 11/1984 |

(Continued)

*Primary Examiner* — Jerry Blevins
(74) *Attorney, Agent, or Firm* — Jacobson Holman, PLLC.

(57) ABSTRACT

A clip-on bracket for a cable outlet of a plug-in connector, wherein the clip-on bracket has a first end that can be brought into touching contact with a cable outlet of the plug-in connector, and wherein the clip-on bracket, has a second end that can be brought into touching contact with the cable outlet or with a cable sheath of the cable connected to the plug-in connector. The first end is connected to the second end via two webs, so that the cable outlet and/or the connected cable is only partially covered by the webs of the clip-on bracket.

14 Claims, 2 Drawing Sheets

(56) References Cited

FOREIGN PATENT DOCUMENTS

Figure 5:
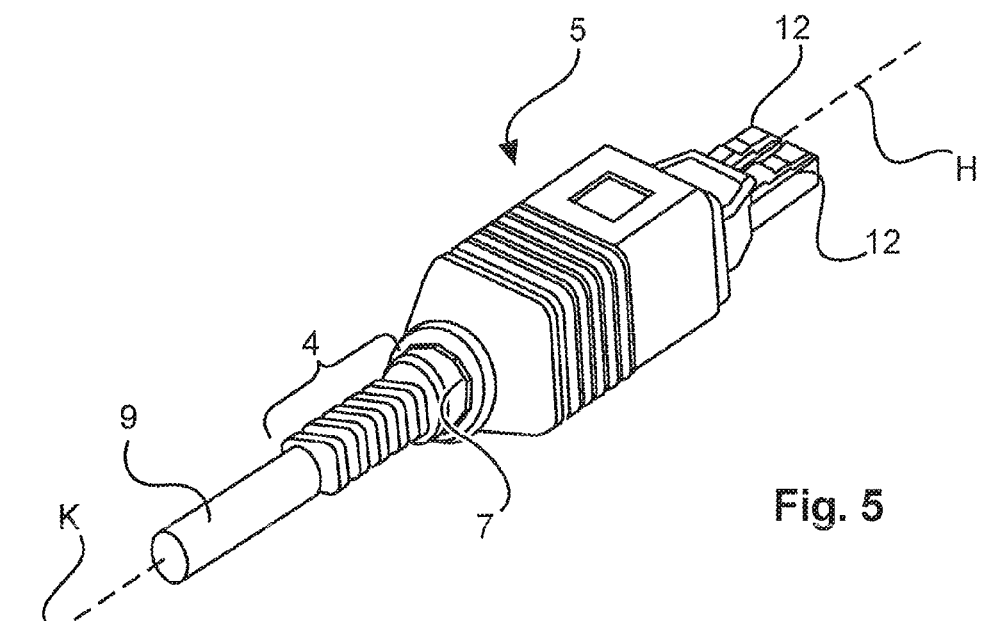

JP 2000338339 12/2000
WO WO 2012/136702 10/2012

\* cited by examiner

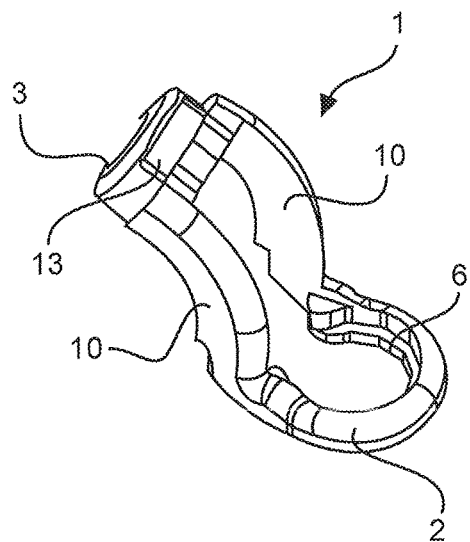
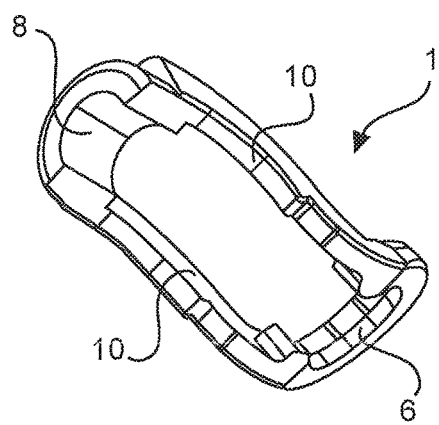
Fig. 1
Fig. 2
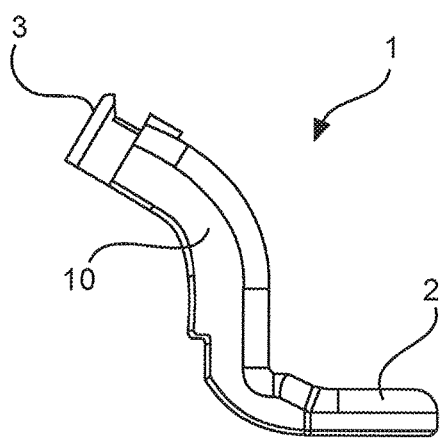
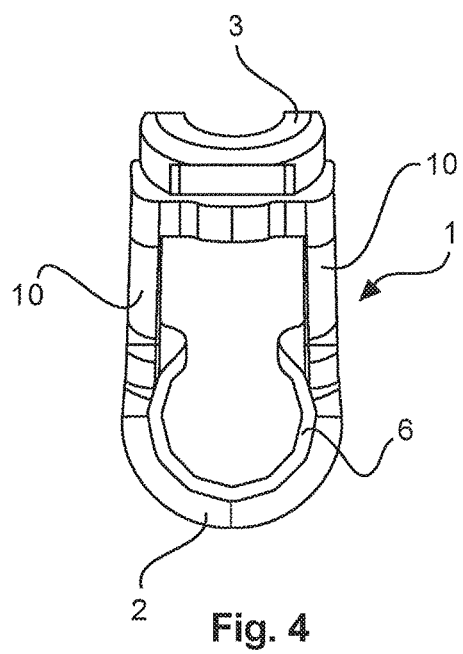
Fig. 3
Fig. 4

CLIP-ON BRACKET FOR A PLUG-IN CONNECTOR

The invention relates to a clip-on bracket for a cable outlet of a plug-in connector and a plug-in connector suitable for receiving such a clip-on bracket.

Clip-on brackets are needed in order to bend a cable connected to a plug-in connector in a certain direction away from the plug-in connector housing and is to fix the bending direction. For example, in the case of control cabinets and/or electric devices, it makes sense to carry all the connected cables away in the same direction.

Prior Art

DE 20 2007 008 980 U1 shows a plug-in connector having a separate cable outlet element that can be clipped onto the housing body. The cable connected to the plug-in connector runs within the cable outlet element. The cable outlet element has an angled design, so that the cable is tilted away at a certain angle from the plug-in connector housing or from the main axis of symmetry thereof.

The cable outlet element has a closed design because individual conductors of the multi-wired cable extend on the inside without a protective cable sheath. Such a design is limited in terms of its angular range. For example, a bending angle of 90° cannot be achieved.

A further drawback is that the cable outlet element has to include a strain relief for the connected cable. This causes the design to be even larger. This solution is cumbersome.

US 2004 012 16 46 A1 shows a clip-on bracket having the shape of a bent channel. US 2010 024 70 41 A1 shows a comparable solution. Such clip-on brackets can be used as a so-called retrofit solution for a plug-in connector. As a result of the semi-open geometry, however, the angular range that can be realised is limited, WO 2012 136 702 A1 shows a clip-on bracket consisting of a plurality of parts. The production of such a clip-on bracket is rather complex and therefore expensive. Here, too, the angular range that can be realised is limited.

OBJECT OF THE INVENTION

It is the object of the invention to propose a clip-on bracket for a plug-in connector that is implemented in a compact manner and at the same time covers a large angular range.

Advantageous embodiments of the invention are indicated in the dependent claims.

A clip-on bracket is as a rule clipped onto a cable outlet of a plug-in connector in order to bend the cable connected to the plug-in connector in a desired direction away from the main axis of symmetry of the plug-in connector.

The clip-on bracket proposed here has a first end that can be brought into touching contact or engagement with the cable outlet. As a rule, the first end is pushed onto the bottom region of the cable outlet.

The clip-on bracket has a second end that can also be brought into touching contact or engagement with the cable outlet, however as a rule rather with the cable sheet of the connected cable. The spatially different coordinates of the first and the second end determine the so-called bending angle of the cable connected to the plug-in connector.

Advantageously, the first end is connected to the second end via two individual webs. The surfaces of the webs, which are aligned with the cable outlet, are oriented parallel to each other. The distance of the webs is only slightly greater than the diameter of the cable outlet, so that the cable outlet can run tightly between the webs.

In a preferred embodiment, the two webs are designed to be bent. The bend of both webs is selected to be the same. As a result of the bent design of the webs, the spatial position as mentioned above may be determined by the first and second ends of the clip-on bracket and thus by the bending angle of the cable. The cable outlet and, if necessary, also part of the cable can be inserted through the webs. This is possible only in the case of the open shape of the clip-on bracket according to the invention. As a result, the clip-on bracket has, in the case of a relatively great bend of the cable outlet, for example 90°, a very low profile.

However, it would also be possible to provide non-bent webs. The angle at which the webs will then protrude away from the plane of the first end would then determine the spatial position of the first and second ends of the clip-on bracket.

The first end of the clip-on bracket is substantially formed as an open segment of a circle, with the opening in the circular segment being present so that the clip-on bracket can be pushed onto the bottom region of the cable outlet. As a result, the clip-on bracket is also suitable for fully pre-assembled plug-in connectors and can be retrospectively clipped on.

In a particularly preferred embodiment, a regular or symmetric polygon structure is moulded on within the circle segment. The bottom region of the cable outlet has a matching regular or symmetric polygon structure. The number of the so-called n corners of the polygon structures of the clip-on bracket and the cable outlet are matched to each other. As a result of the polygon structure, the clip-on bracket may be positioned differently along the circumferential direction of the cable outlet or of the cable sheath, as a result of which the direction in which the cable is bent away from the plug-in connector can be determined. As a result, the clip-on bracket can be flexibly used for example in machine installations.

Preferably, the second end of the clip-on bracket is formed as an arc element. This arc element is in touching contact with the cable sheath of the connected cable and pushes the latter into the desired angular position.

As has already been described above, the first and second ends of the clip-on bracket are preferably connected to each other via two webs. In this case, the clip-on bracket has altogether an open, frame-shaped structure. It has explicitly not a closed design as shown in DE 20 2007 008 980 U1. A semi-closed implementation, for example in the form of a channel as shown in US 2002/0122652 A1, is explicitly not suitable either. The open, frame-shaped structure allows a compact design of the clip-on bracket. Bending the cable away by approx. 90° is possible with an open structure in such a compact design. As a result, the clip-on bracket can be used in applications that do not offer much space.

The angle that is enclosed by the main axis of symmetry of the plug-in connector and the cable outlet direction is also referred to as the bending angle of the cable connected to the plug-in connector. Preferably, the angle is between 30° and 120°, however particularly preferably between 45° and 90°.

Advantageously, the clip-on bracket has first fastening means, by means of which the clip-on bracket can be fixed to the cable outlet in a captive manner. It is further advantageous to provide second fastening means, by means of which the clip-on bracket can be fixed to the cable in a captive manner. As a result, it is impossible for the clip-on bracket to fall unintentionally off and it is vibration resistant, which is quite appropriate in mechanical engineering. The fastening means are preferably so-called cable ties. These are part of any toolbox and are therefore readily available.

In a particularly preferred embodiment, the clip-on bracket is made from plastics, preferably from a cold-forming plastic. Due to the cold-forming plastic, the bend of the above-mentioned webs can be retrospectively modified. As a result, storage of such clip-on brackets is simplified.

However, it is also advantageous to produce the clip-on bracket from metal. In the case of a metal design, the webs can also be bent.

An arrangement made from a plug-in connector and a clip-on bracket is also claimed in this patent application. It is particularly advantageous to use a clip-on bracket according to the invention with optical plug-in connectors. The cables connected here include optical fibres which, as is known, react to excessively great bends in a particularly sensitive manner. As a result of the clip-on bracket according to the invention, an excessively high bending stress is avoided.

The essence of the invention relates to a clip-on bracket for a cable outlet of a plug-in connector, wherein the clip-on bracket (1) has a first end (2) that can be brought into touching contact with a cable outlet (4) of the plug-in connector (5) and wherein the clip-on bracket (1) has a second end (3) that can be brought into touching contact with the cable outlet (4) or with a cable sheath of the cable (9) connected to the plug-in connector (5). The first end (2) is connected to the second end (3) via two webs (10), so that the cable outlet (4) and/or the connected cable (9) is/are only partially covered by the webs (10) of the clip-on bracket (1). As a result, the clip-on bracket may have a particularly small design, whilst bending angles of the cable of approx. 90° may still be achieved.

EMBODIMENT EXAMPLE

Figure 6:
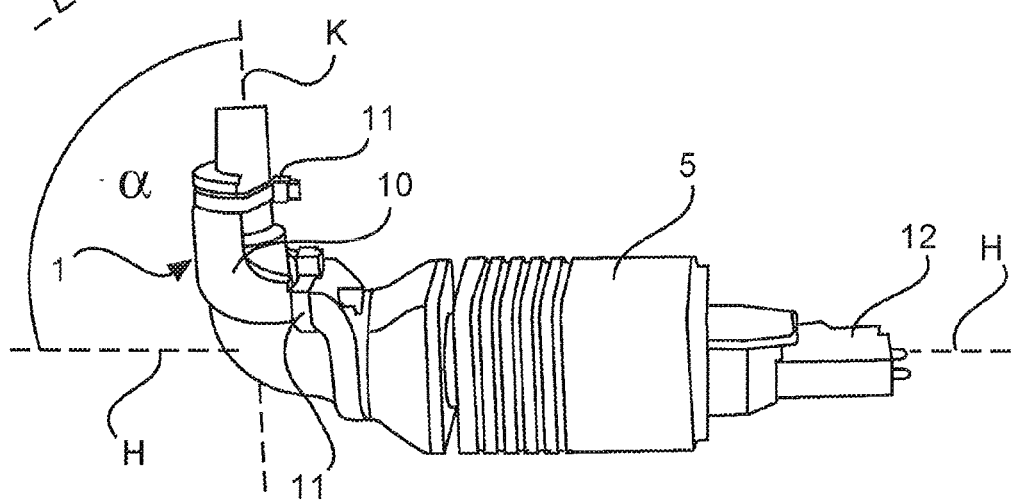
Figure 7:
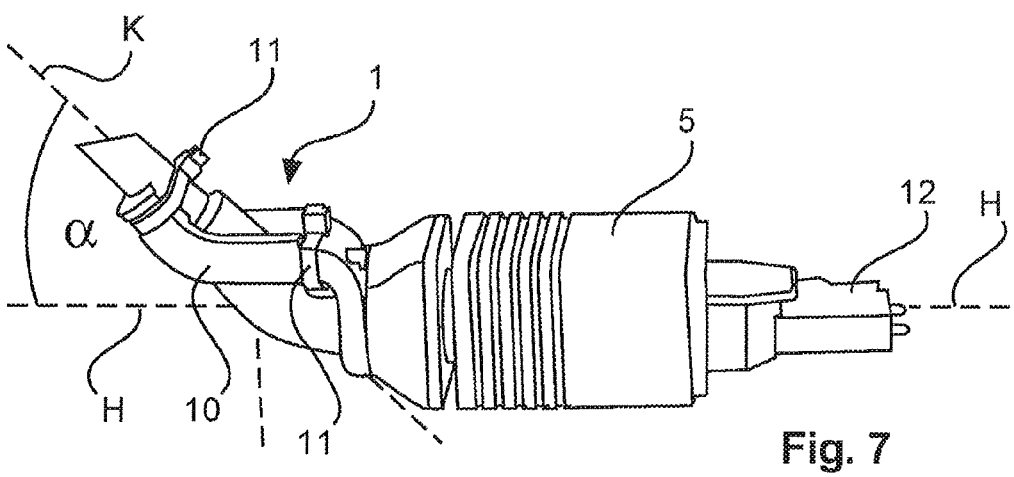

An embodiment example of the invention is shown in the drawings and will be explained in more detail below, wherein:

FIG. 1 shows a perspective view of a clip-on bracket according to the invention, FIG. 2 shows a further perspective view of the clip-on bracket according to the invention, FIG. 3 shows a lateral view of the clip-on bracket, FIG. 4 shows a top view of the clip-on bracket, FIG. 5 shows a perspective view of an optical plug-in connector, FIG. 6 shows a perspective view of the optical plug-in connector with a clip-on bracket in a 90° design, and FIG. 7 shows a perspective view of the optical plug-in connector with a clip-on bracket in a 45° design.

FIGS. 1 to 4 show a possible embodiment of the clip-on bracket 1 according to the invention. However, the invention is not limited to this specific embodiment.

The clip-on bracket 1 has a first end 2 that can be clipped onto a cable outlet 4 of an optical plug-in connector. The first end is substantially formed as an open segment of a circle that has a regular polygon structure 6 on the inside.

In its bottom region, the cable outlet 4 of the optical plug-in connector 5 also has a regular polygon structure 7 that matches the polygon structure 6 of the clip-on bracket 1. As a result, the clip-on bracket can be positioned in various positions along the circumferential direction of the cable outlet 4.

The clip-on bracket 1 has a second end 3 that has a substantially arc-shaped design. The arc element 8 is designed to push the cable 9 of the plug-in connector 5 away at a desired angle from the main axis of symmetry H of the plug-in connector 5.

The first end 2 and the second end 3 of the clip-on bracket 1 are connected to each other via two webs 10. In the central region, the webs 10 are bent. One could also say that the webs 10 have a curved design. As a result of the curvature of the webs 10, also the angle a is determined, by which the cable is tilted away from the main axis of symmetry H of the plug-in connector 5.

On the second end 3 of the clip-on bracket 1, a groove 13 for receiving a cable tie 11 is provided.

FIG. 5 shows an optical plug-in connector 5 that can be equipped with a clip-on bracket 1. The regular polygon structure 7 necessary for this, which is located in the bottom region of the cable outlet 4, has already been mentioned above. Further upwards, the cable outlet has a helical design and serves as bending protection. Without the clip-on bracket, the main axis of symmetry H and the cable outlet direction (cable outlet axis) K are aligned to each other. The cable 9 is not bent away from the main axis of symmetry H.

FIGS. 6 and 7 show an optical plug-in connector 5 with a clipped-on clip-on bracket 1. The optical plug-in connector 5 comprises a support 12 for so-called ferrules that enclose an optical fibre for transmitting signals. The cable outlet direction K and the main axis of symmetry H of the plug-in connector 5 enclose an angle α. In FIG. 6, the curvature of the webs 10 is greater than in FIG. 7. In FIG. 6, the angle α=90° and in FIG. 7 α=45°.

The first end 2 of the clip-on bracket 1 is fixed to the bottom part of the cable outlet 4 of the plug-in connector 5 with a cable tie 11. The second end 3 is also fixed to the cable sheath of the connected cable 9 with a cable tie 11.

Clip-on Bracket for a Plug-In Connector

| List of Reference Numerals | |
|---|---|
| 1 | Clip-on bracket |
| 2 | First end |
| 3 | Second end |
| 4 | Cable outlet |
| 5 | Optical plug-in connector |
| 6 | Regular polygon structure |
| 7 | Regular polygon structure |
| 8 | Arc element |
| 9 | Cable |
| 10 | Web |
| 11. | Cable tie |
| 12. | Support for a ferrule |
| 13. | Groove |
| H | Main axis of symmetry |
| K | Cable outlet direction |
| α | Angle |

The invention claimed is:

1. A clip-on bracket for a cable outlet of a plug-in connector, the cable outlet having a cable outlet direction (K) and the plug-in connector having a main axis of symmetry (H);

wherein the clip-on bracket (1) has a first end (2) that can be brought into touching contact with the cable outlet (4) of the plug-in connector (5), and wherein the clip-on bracket (1) has a second end (3) that can be brought into touching contact with the cable outlet (4) or with a cable sheath of the cable (9) connected to the plug-in connector (5), characterised in that
- the second end (3) has an arc element (8) into which the cable sheath of the connected cable (9) can be inserted and which second end (3) pushes the cable (9) into an angular position with an angle ($\alpha$), wherein the angle ($\alpha$) encloses the main axis of symmetry (H) of the plug-in connector (5) and the cable outlet direction (K) and is greater than 0°,
- the first end (2) is connected to the second end (3) via two individual webs (10), and
- the clip-on bracket (1) has an open, frame-shaped structure.

2. The clip-on bracket according to claim 1, characterised in that the two webs (10) are designed in a bent manner.

3. The clip-on bracket according to claim 2, characterised in that the first end (2) has a regular or symmetrical polygon structure (6).

4. The clip-on bracket according to claim 2, wherein the clip-on bracket (1) is positioned on the outer side of the cable with respect to the direction of pushing.

5. The clip-on bracket as claimed in claim 2, wherein said two webs are curved and parallel to each other and open therebetween to receive the cable outlet or cable sheath of the cable.

6. The clip-on bracket according to claim 1, characterised in that an angle ($\alpha$) that encloses the main axis of symmetry (H) of the plug-in connector (5) and the cable outlet direction (K) is between 30° and 120°.

7. The clip-on bracket according to claim 6, characterised in that the angle ($\alpha$) that is enclosed by the main axis of symmetry (H) of the plug-in connector (5) and the cable outlet direction (K) is between 45° and 90°.

8. The clip-on bracket according to claim 1, characterised in that the clip-on bracket (1) has first fastening means (11) for affixing the clip-on bracket (1) to the cable outlet (4) in a captive manner.

9. The clip-on bracket according to claim 8, characterised in that the clip-on bracket (1) has second fastening means (11) for affixing the clip-on bracket (1) to the cable (9) in a captive manner.

10. The clip-on bracket according to claim 1, characterised in that the clip-on bracket is made from plastic.

11. The clip-on bracket according to claim 1, characterised in that the clip-on bracket (1) is made from metal.

12. A plug-in connector having a clip-on bracket according to claim 1.

13. The plug-in connector according to claim 12, characterised in that the plug-in connector has a cable outlet (4) with an integrated cable strain relief, and the cable outlet (4) has a regular or symmetric polygon structure (7).

14. The plug-in connector according to claim 12, characterised in that the plug-in connector (5) is an optical plug-in connector.

* * * * *